United States Patent Office 3,274,401
Patented Sept. 20, 1966

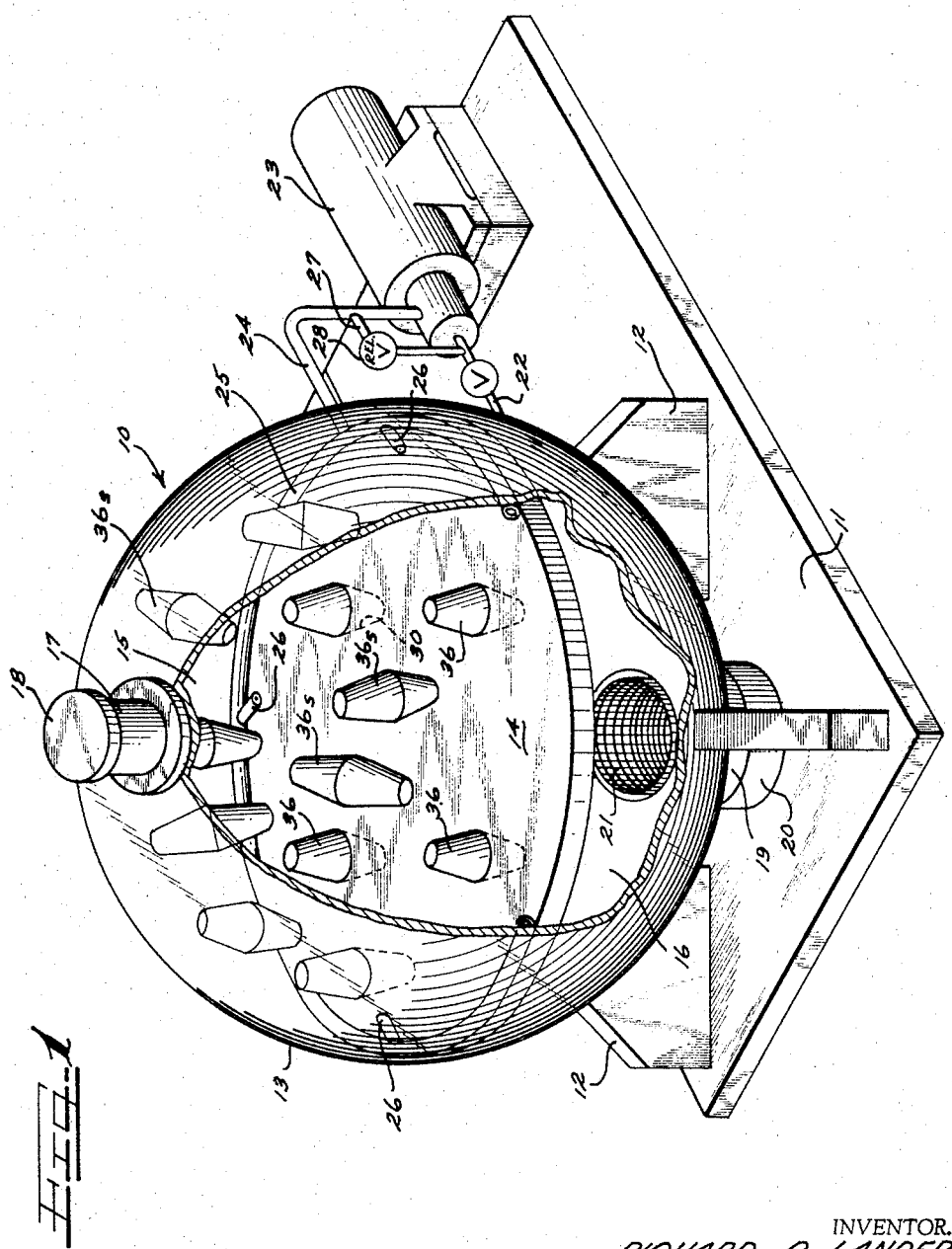

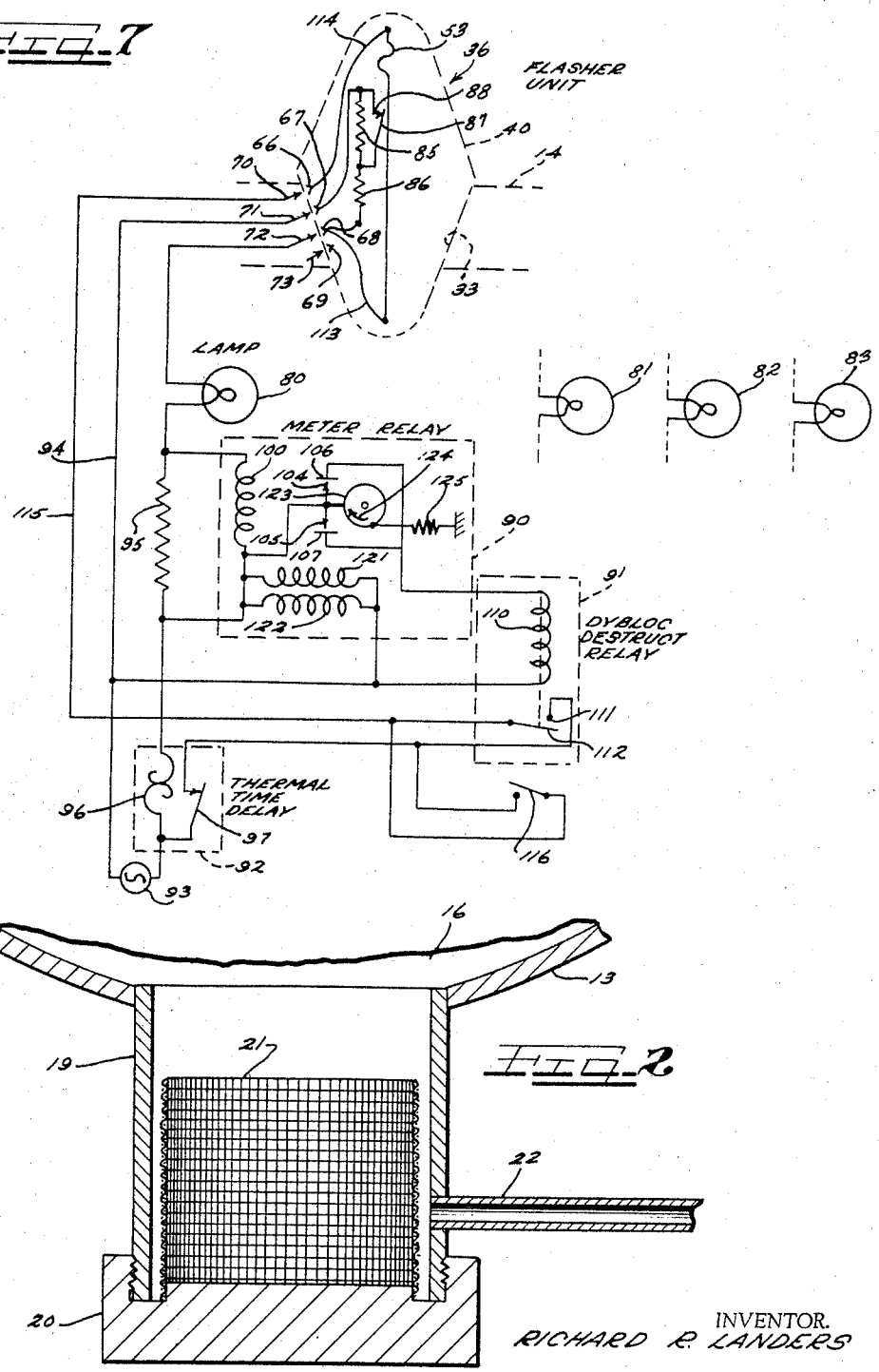

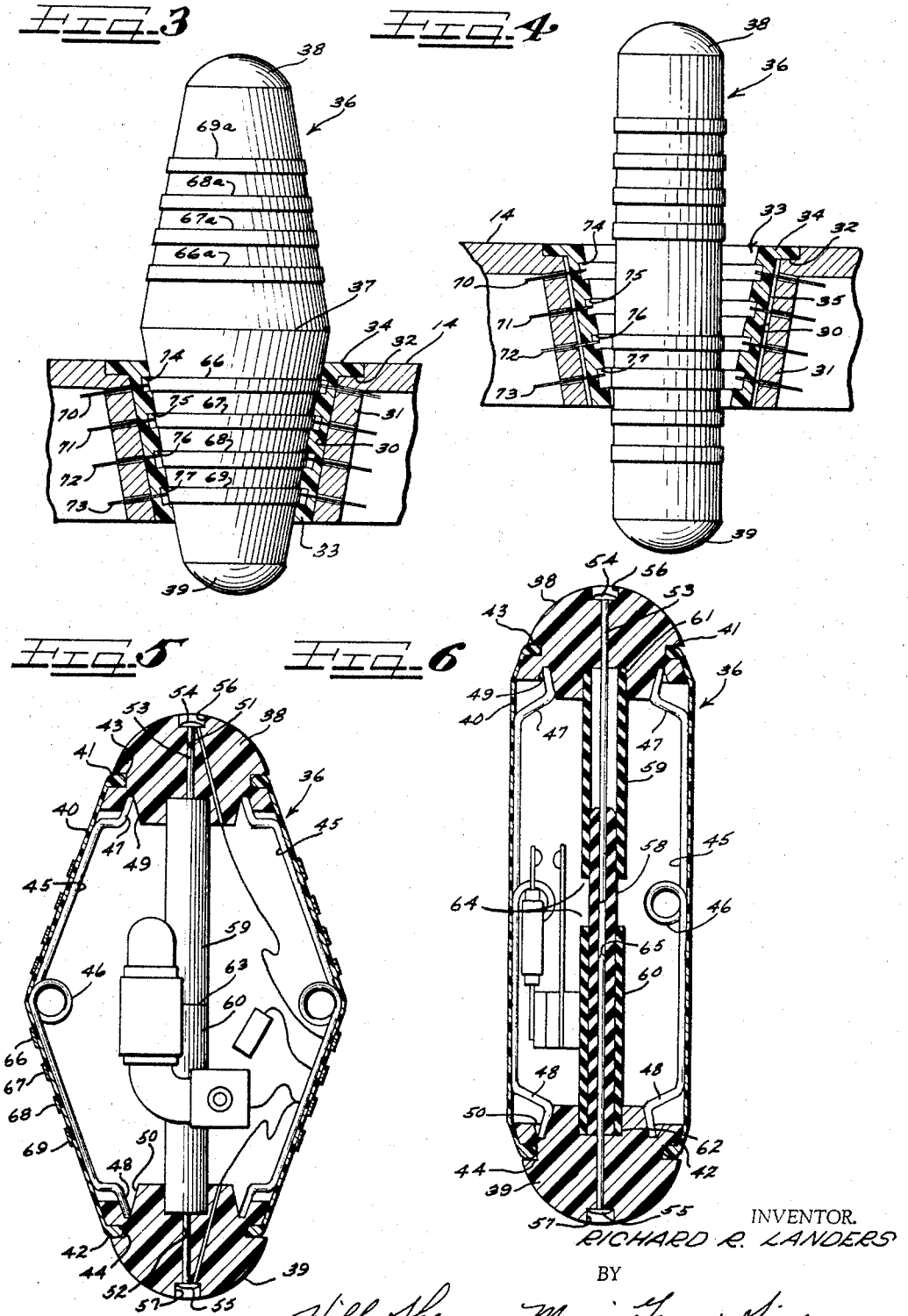

3,274,401
SELF-REPAIRING AND SELF-SUSTAINING
SYSTEM
Richard R. Landers, Beachwood, Ohio, assignor to Thompson Ramo Wooldridge Inc., Cleveland, Ohio, a corporation of Ohio
Filed Nov. 20, 1961, Ser. No. 153,445
8 Claims. (Cl. 307—92)

This invention relates to a self-repairing and self-sustaining system, and more particularly to a self-replenishment mechanism functionally capable of providing a higher level of reliability than can be attained by using conventional methods involving repetitive systems and means for switching upon failure of one, to another.

Present technological programs call for levels of reliability and endurance not achievable in current equipment without the use of excessive repetition of entire systems. In space travel, for example, if multiple equipments are provided in a stand-by capacity in the event of malfunction, this would impose a prohibitive weight and volume penalty. For this reason, equipment that repairs itself is desirable. Also, in limited quarters, it is desirable to have equipment that can change functions, as for instance from a process control computer to a navigational determining computer, as the need arises, rather than providing duplicate equipment. Furthermore, in certain circumstances such as space travel or in unattended locations, it is essential that the equipment perform all of the functions expected of it with a minimum of attention, or none at all, of a support nature other than initially providing it with its power and constituent parts replenishment requirements.

In advanced electronic systems, especially those intended for extended duration applications, as in the case of space missions and unattended installations, reliability requirements approach one hundred percent with 100% confidence levels. Such requirements can be met only by systems having a reliability unattainable with conventional approaches, notwithstanding the conventional use of redundant systems with means for switching from one to another.

It is therefore an object of the present invention to provide a self-repairing and self-sustaining system, without repetition of entire systems, or mechanisms.

It is a further important object of this invention to provide an electronic system having a self-replacing electronic sub-assembly, or element, capable of self-diagnosis for internal failure and of initiating its own replacement in the system.

Other and further important objects of this invention will become apparent to those skilled in the art from the following detailed disclosure of a preferred embodiment of the invention as shown in the drawings attached hereto and made a part hereof.

On the drawings:

FIGURE 1 is an isometric view, partly broken away and in section for the sake of clarity, illustrating somewhat diagrammatically a system embodying my invention;

FIGURE 2 is an enlarged, fragmentary, vertical sectional view of the lower portion, or waste removal part, of the enclosure unit shown in FIGURE 1;

FIGURE 3 is an enlarged elevational view, partly in section, illustrating a sub-assembly, hereinafter referred to as a "dybloc," in operative position in the system;

FIGURE 4 is a similar elevational view, partly in section, illustrating a dybloc in collapsed, or inoperative, condition, ready for displacement from the system;

FIGURE 5 is an enlarged longitudinal sectional view of a dybloc in operative condition;

FIGURE 6 is a similar enlarged, longitudinal sectional view of a dybloc in collapsed, or inoperative, condition; and FIGURE 7 is a wiring diagram of the system.

As shown on the drawings:

The reference numeral 10 indicates generally a physical embodiment of the system of my invention. Said embodiment comprises a supporting base or standard 11, on which is mounted, as by means of blocks 12, a generally spherical housing 13 for enclosing the system.

The spherical housing 13 is divided internally by a platform 14 of suitable diameter to fit within the spherical housing 13 and divide the same into an upper compartment 15 and a lower compartment 16. A cylindrical fitting 17, provided with a removable cap 18 is secured to the upper portion of the housing 13 to provide access thereto for loading the same. The lower portion of the housing 13 is provided with a tubular extension 19 in open communication with the lower compartment 16 to afford means for removing "waste" from the system. As shown in more detail, in FIGURE 2, the lower end of the tubular extension 19 is threaded for receiving a removable cap 20. The cap 20 supports an upstanding cylindrical screen 21 of smaller diameter than the diameter of the tubular extension 19 so as to be spaced from the inner wall thereof. As will be explained later, the screen 21 serves to remove waste from the fluid circulating system, a return line of which, indicated by the reference numeral 22, leads from the lower portion of the tubular extension 19.

The fluid circulating system just referred to includes a pump-motor assembly 23 supported on the base 11 and connected on its discharge side through a line 24 to the interior of the housing 13 within the upper compartment 15 thereof. Within said housing, the pump discharge line 24 connects with a circular run of tubing 25 resting upon the partition 14 at the periphery thereof. Said circular tubing 25 is provided at a plurality of equally-spaced points, such as 4, with nozzles 26 for the discharge of jets of fluid within the upper compartment 15 for a purpose that will be more fully explained as this description proceeds. Since, under some circumstances, there are no fluid passages from the upper compartment 15 to the lower compartment 16, a by-pass line 27 is provided between the discharge line 24 and the pump intake line 22, thereby enabling the pump to be run continuously. A relief valve 28 in the by-pass line 27 prevents the building-up of excessive pressure in the fluid discharge line 24, while at the same time providing the necessary pressure, when needed, to effect the discharge of the fluid through the nozzles 26 and the resultant circulation of the fluid through the upper compartment 15.

As best shown in FIGURES 3 and 4, the platform, or partition, 14 is provided with a plurality, in this case four, of downwardly tapering sockets 30, the walls 31 of which may be formed integral with the partition 14. Preferably, the upper surface of the partition 14 is provided with a counterbore 32 at the upper open end of each of the sockets 30 to receive a flanged liner 33 of a shape conforming to that of the sockets when the upper flanged portion 34 thereof is seated within the counterbore 32. Each of the liners 33 is preferably formed of flexible plastic material capable of conforming completely with the tapered surface of the corresponding socket 30, as illustrated in FIGURE 3, when the liner is subjected to expanding forces. In the absence of such expanding forces, each liner 33 normally assumes the position illustrated in FIGURE 4, with the tapered downwardly extending portion thereof slightly spaced from the wall of the socket 30, as indicated at 35.

The purpose of the sockets 30, with their accompanying liners 33, is to receive a self-assembly unit, indicated by the reference numeral 36 and herein termed a dybloc. In its operative condition, as illustrated in FIGURES 3 and 5, a dybloc 36 is of symmetrical shape about its transverse median plane, indicated by the line 37 (FIGURE 3), being of generally conical configuration terminating in upper and lower segmental spherical portions 38 and 39, respectively. Since all of the dyblocs 36 are of identical construction, only one need be described. An envelope 40 (FIGURES 5 and 6) of fluid-impermeable, flexible plastic film material extends between and is joined at its upper and lower ends to the segmental spherical end portions 38 and 39, as at 41 and 42, respectively. Said segmental spherical end portions 38 and 39 may be suitably formed of plastic material also, but are relatively rigid in character and are solid, with outer annular grooves 43 and 44, respectively, for receiving the beaded upper and lower edges 41 and 42 of the plastic sheet 40. Self-loading springs 45, of which there may be six in number, serve to hold the dybloc in its expanded, operative position, as illustrated in FIGURES 3 and 5, as will now be explained in greater detail.

Each of the springs 45 is made of a length of wire of suitable resiliency having an intermediate loop 46 of one or more complete turns, from which extend straight portions of the wire terminating in inwardly offset ends 47 and 48. These ends 47 and 48 are received, respectively, in annular recesses 49 and 50 formed in the inner opposed faces of the upper and lower end portions 38 and 39. Additionally, said end portions 38 and 39 are provided with counterbored axial openings 51 and 52, respectively, for receiving the ends of a fuse element 53. Said fuse element 53 is in the form of a wire, or rod of fine diameter, that is of a length such that when the fuse element is in place in a dybloc, it is under tension and holds the springs 45 in their outwardly bowed, loaded condition. Without going into any great detail, at the time of inserting the fuse element in place in a dybloc, the end portions 38 and 39 thereof may be confined in a jig to cause the springs 45 to bow outwardly and expand the enveloping sheet 40 to the operative form of dybloc illustrated in FIGURES 3 and 5, and while so expanded, the fuse element 53 is inserted and its ends headed, as at 54 and 55, for retention within the counterbores 56 and 57 of the end portions 38 and 39, respectively. The intermediate portion of the fuse element 53 is surrounded by an inner tube 58 of insulating material (FIGURE 6) and outer sections 59 and 60, also of insulation material, held at their respective upper and lower ends 61 and 62 in the end portions 38 and 39. The tube sections 59 and 60 are of such length as to be in abutting relation, as at 63 (FIGURE 5) when the dybloc is in operative condition, but separated, as at 64 (FIGURE 6) when the dybloc is in inoperative, collapsed, condition. The latter occurs when the fuse element 53 is ruptured, as indicated by the break 65 (FIGURE 6).

Without going into the description extensively at this time, it may suffice to point out that each of the dyblocs 36 contains a sub-assembly of electrical and/or electronic elements operatively interconnected in a circuit that is itself connected to external contacts formed on the enveloping sheet 40. These external contacts, of which four are shown on each side of the median plane 37 (FIGURE 3), are constituted by bands 66, 67, 68 and 69 of electrically conductive material, imprinted or otherwise deposited as a thin annular contact band on the outer surface of the enveloping sheet 40. The bands 66 to 69, inclusive, on one side of the median plane 37 are duplicated by exactly similar and equally spaced bands 66a through 69a, inclusive. The purpose of such duplication is to render it immaterial which end of a dybloc becomes inserted in one of the sockets 33, as will be more clearly understood as the description of the invention unfolds. For the purpose of making contact with one or more of the contact bands 66 to 69, inclusive, each of the sockets 33 is provided with an equal number of similarly spaced contact pins 70 to 73, inclusive, which project through the socket wall 31 and the corresponding wall of the liner 33 with their inner ends terminating in correspondingly arranged and spaced annular grooves 74 to 77, inclusive, formed in the inner surface of said liner 33. When an operative dybloc 36 becomes seated in one of the sockets 30, the wedging action resulting from the downwardly tapered form of the lower end of such dybloc forces the liner 33 into snugly fitting relationship with the wall of the socket 30 and at the same time establishes contact between the contact bands 66 to 69, inclusive, and the corresponding contact pins 70 to 73, inclusive.

Returning now to FIGURE 1, it will be seen that four of the dyblocs 36 are in operative position, received within the corresponding number of sockets 30. Other dyblocs, indicated by the reference numeral 36s, are provided as spares within the upper compartment 15. Each of said dyblocs 36s is in an expanded, operative condition, identical with that of each of the operating dyblocs 36, and is held in readiness, suspended, or partially so, within the fluid, preferably a dielectric liquid, that fills the upper compartment 15 under the head of pressure afforded by the pump-motor unit 23. So long as all four of the operating dyblocs 36 remain in operating condition, that is, so long as no failure in the system occurs, the spare dyblocs 36s remain more-or-less in stationary, random positions wholly immersed within the fluid, and with little or no flow of fluid into the compartment 15 through the nozzles 26.

However, as soon as one of the operating dyblocs 36 becomes inoperative and collapses, due to the rupture of the fuse element 53 and the consequent elongation of the dybloc under the expanding action of the springs 45, as best shown in FIGURES 4 and 6, the collapsed dybloc is free to pass through the opening provided by the restricted lower end of the socket 30. As soon as that condition obtains, fluid from the upper compartment 15 is free to flow around the collapsed inoperative dybloc 36 and through the open socket 30 into the lower compartment 16, with the result that pressure in the upper compartment drops and the relief valve 28 closes to establish flow of fluid from the pump through the discharge line 24, the circular line 25 and the nozzles 26. Due to the orientation of the several nozzles 26 and the vortex action created by the opening of the one socket which the now inoperative dybloc only partially fills, said inoperative dybloc will be carried through said socket opening with the rush of fluid and one of the spare dyblocs 36s will be carried into position above the now open socket and be automatically seated therein.

As soon as a spare dybloc becomes properly seated in operative position within a socket 30, contacts are made between the various contact bands 66 to 69, inclusive, and the corresponding contact pins 70 to 73, inclusive, and the system is thereby restored to operating condition.

With the restoration of operating conditions, flow of the fluid from the upper compartment 15 to the lower compartment 16 is cut off and bypass relief valve 28 opens to establish flow through the bypass 27 back to the pump of the motor-pump unit 23. Repetition of the cycle just described takes place whenever another dybloc fails or is rendered inoperative through failure in the system. Dyblocs so rendered inoperative are flushed into the lower compartment by the flow of fluid collected therein and may be removed when the proper occasion arises. Removal is accomplished by unscrewing the lower cap 20 and throwing away the inoperative dyblocs collected within the screen 21 or those within the lower compartment 16 that fall out through the tubular extension 19 when the cap is removed. Other spare dyblocs in operative condition can, at the same time, be introduced into the upper compartment 15 through the loading spout 17.

While it has been indicated in the foregoing description that circulation of the fluid from the upper compartment 15 to the lower compartment 16 of the housing 13 is cut off when all of the operating dyblocs are in contact-making relationship within the corresponding sockets 30, this may not be so in actual operation, since there will be sufficient leakage past the several dyblocs to maintain a constant circulation, although at a reduced rate of flow, and a sufficient differential pressure between the upper and lower compartments to maintain the operating dyblocs in proper seating relationship in their respective sockets, and also to maintain the spare dyblocs in a random, floating, or semi-floating state. In this state, the system continues to be self-repairing and self-maintaining so long as replacement dyblocs are available for failures as they occur.

FIGURE 7 illustrates an electric circuit which is completed by one of the four dyblocs which are in operative position in FIGURE 1. For purposes of illustration, a relatively simple circuit has been selected which is designed to transfer cyclically interrupted electrical power to an incandescent lamp 80. A bank of four such lamps 80, 81, 82 and 83 are contemplated for the embodiment of FIGURE 1 each associated with one of the dyblocs by means of a circuit identical to that shown in FIGURE 7. Since the arrangement is identical with respect to each of the lamps, only the circuit for lamp 80 has been illustrated in FIGURE 7.

In FIGURE 7, the envelope of a dybloc 36 has been diagrammatically indicated in dash outline and is shown in operative position in relation to a socket 33 in the platform 14. The conductive bands 66–69 and brushes 70–73 of FIGURE 3 have been diagrammatically indicated in FIGURE 7 and have been designated by corresponding reference numerals. The fuse element 53 shown in detail in FIGURES 5 and 6 has been shown diagrammatically in FIGURE 7 and has been designated by the same reference numeral.

By way of illustration, a flasher unit has been shown as contained within dybloc 36 and may include a heating element represented by resistor 85 and a current limiting resistor 86. A thermally responsive switch element 87 controls a shunt path for resistor 85 and is operative to close said shunt path when the heating element reaches a predetermined temperature. The switch element 87 may, of course, comprise a bi-metallic blade which is responsive to the heat generated by the resistor 85 to deflect into engagement with stationary contact 88.

In the illustrated circuit, the remaining components comprising lamp 80, meter relay 90, dybloc destruct relay 91 and thermal time delay 92 have been shown as being external to the dybloc 36. An alternating current power source is indicated at 93 in FIGURE 7. When the dybloc is moved into operative position, continuity is established between bands 66–69 and brushes 70–73, respectively, whereupon a circuit is completed which extends from the source 93 via conductor 94, brush 71, band 67, to the flasher unit resistance elements 85 and 86, and from band 68, brush 72, lamp 80, and meter relay dropping resistor 95 to the heating element 96 of the thermal time delay component 92. Contact 97 of the time delay 92 is closed as soon as the heating element 96 reaches its operating temperature to connect the dybloc destruct relay 91 into the circuit.

When the heating element 85 reaches its predetermined operating temperature, contact 87 closes, increasing the amplitude of current flow through lamp 80 to produce a flash and increasing the amplitude of current flow through resistor 95 to increase the amplitude of the voltage applied to the control winding 100 of the meter relay 90. Before the amplitude of the current in the control winding 100 builds up to a maximum value, heating element 85 will have cooled sufficiently to allow contact 87 to open. Since the amplitude of the voltage across resistor 95 is now reduced, the current in control winding 100 of meter relay 90 will begin to approach a minimum amplitude value. Before the current in the control winding 100 is reduced to the minimum amplitude value, however, the heater element 85 again reaches a temperature sufficient to close contact 87. The meter relay is so constructed that the normal fluctuation in the amplitude of the current flowing through control winding 100 will maintain the movable contacts 104 and 105 in the open condition relative to stationary contacts 106 and 107 as illustrated in FIGURE 7. If, however, a short circuit is produced by failure of contact 87 to open, the current amplitude in the control winding 100 will assume a value sufficient to close one of the pair of contacts, for example contacts 104 and 106 of meter relay 90. Conversely, if an open circuit develops in the flasher unit by failure of contact 87 to close, the current in control winding 100 will assume a minimum amplitude value whereupon contacts 105 and 107 of the meter relay will be closed. Either of these conditions will cause the energization of relay coil 110 of the dybloc destruct relay 91 thus causing the closure of contacts 111, 112 and the application of a voltage across the fuse element 53. The circuit controlled by the dybloc destruct relay 91 extends from the left terminal of power source 93, through conductor 94, brush 71, band 67, resistors 85 and 86, conductor 113, fuse 53, conductor 114, band 66, brush 70, conductor 115, contacts 111 and 112, and thermal time delay contact 97, to the right hand terminal of power source 93.

Completion of this circuit will produce a sufficient electric current flow through the fuse 53 to rupture the fuse as indicated at 65 in FIGURE 6, causing the removal of the dybloc and replacement thereof. During the replacement interval, the other three lamps 81–83 will normally remain in operation.

A manually operated switch is indicated at 116 which may be closed to simulate a dybloc failure and thus to initiate replacement of a dybloc.

The thermal time delay relay 92 will cause opening of contact 97 as soon as the original dybloc is "destroyed" to prevent application of the fuse rupturing voltage to the fuse of a replacement dybloc until equilibrium conditions have been attained (with meter relay 90 open and dybloc destruct relay 91 deenergized).

It may be noted that a short circuit between bands 67 and 68 will apply a sufficiently high voltage to control winding 100 to close contacts 104 and 106 and thus actuate the dybloc destruct relay. Further a short circuit between bands 66 and 67 will cause the application of a voltage across the fuse 53 to effect removal of the dybloc.

Simply by way of example, the meter relay 90 may comprise an induction-disk power relay which operates on the same principle as the common watt-hour meter. Such a relay may comprise a pair of oppositely poled current windings 121 and 122 arranged on respective magnetic poles at one side of a rotary metal disk which has been indicated at 123 in FIGURE 7. The control winding 100 may be on a third relatively large pole on the opposite side of the disk. Eddy currents are induced in the disk and a resultant torque (in the direction of arrow 124) is proportional to the current flow in the control winding. As diagrammatically indicated in FIGURE 7, the disk 123 may carry movable contacts 104 and 105 and may be resiliently urged in the counter-clockwise direction by means of a tension spring 125. The tension of spring 125 may be adjusted so that with flasher contact 87 held open, the torque exerted on disk 123 will be insufficient to overcome the action of spring 125 and contacts 105 and 107 will be closed; while with contact 87 held closed, the torque will be sufficient to close contacts 104 and 106. The angular spacing of the contacts 106 and 107 will be such that with flasher contact 87 opening and closing under normal operating conditions, the disk 123 will oscillate in an intermediate range of angular positions without closing either set of contacts 104, 106 or 105, 107.

While my invention has been described in connection with an electrical system, it will be understood that this is merely an illustrative embodiment and that my invention is broadly applicable to any system involving a source of energy whether wave energy, i.e. electrical, light, audio or heat, or chemical, dynamic energy or other form of energy. The important features of any such self-repairing, self-sustaining system are a source of energy, a work load, a circuit connecting such energy and work load and including when operating, a circuit-completing unit that is either inherently self-destructive or is rendered so upon the sensing of failure in the system, a supply of similar operative replacement units in the system but not in the circuit and means for replacing a destroyed, or inoperative unit with a replacement operative unit to restore the operativeness of the circuit and therefore of the system.

I claim as my invention:

1. A self-repairing and sustaining system comprising
   (a) a source of energy,
   (b) a work load,
   (c) a circuit for receiving energy from said source and transmitting the same to said work load,
   (d) an operating element in said circuit rendered inoperative and displaceable therefrom in response to failure therein,
   (e) at least one additional operative element in said system but not in said circuit, and
   (f) means automatically operative to displace said operating element when rendered inoperative and to replace the same with an operative element and comprising a fluid medium for moving said additional operative element into the position in said circuit of the element rendered inoperative.

2. A self-repairing and sustaining system comprising
   (a) a source of energy,
   (b) a work load,
   (c) a circuit for receiving energy from said source and transmitting energy to said work load,
   (d) an operative element in said circuit capable of being rendered inoperative and displaceable from said circuit in response to failure therein,
   (e) at least one additional similar operative element for replacement of said operating element,
   (f) a housing enclosing said operating and additional operative elements,
   (g) fluid pumping means circulating a fluid through said housing,
   (h) sensing means responsive to failure in said circuit for rendering an operating element inoperative and displaceable from said circuit, and
   (i) means within said housing so arranged and constructed as to cause said circulating fluid to displace said inoperative element and to replace the same with an operative element.

3. A system as defined in claim 1, in which the circuit is an electrical circuit and the medium is a dielectric liquid.

4. A system as defined in claim 2, in which the circuit is an electrical circuit and the fluid is a dielectric liquid.

5. In a self-repairing and self-sustaining electrical system,
   (a) a housing for enclosing a dielectric liquid and having a partition dividing said housing into upper and lower compartments,
   (b) said partition having a socket opening therethrough and providing a seat for an electrical sub-assembly unit,
   (c) sub-assembly units in said upper compartment adapted when in operative condition to be seated in said socket seat and to be then put into operation and further adapted when in inoperative condition to pass through said sockets into said lower compartment,
   (d) pumping and circulating means including nozzles in said upper compartment for the introduction thereinto of said dielectric liquid to effect the automatic seating of an operative sub-assembly unit in a free socket seat and to effect the removal of an inoperative sub-assembly unit through a socket to make the same free for the reception and seating of an operative sub-assembly unit, and
   (e) an electrical circuit including contacts in said socket and on each of said sub-assembly units, adapted to be closed when an operative sub-assembly unit is seated in said socket.

6. A self-repairing system comprising
   (a) a source of energy,
   (b) a work load,
   (c) a circuit for receiving energy from said source and transmitting the same to said work load,
   (d) an operating element in said circuit rendered inoperative and physically displaceable from its position in said circuit in response to failure therein,
   (e) a plurality of additional operative elements in said system but not in said circuit, and
   (f) means automatically operable for maintaining said additional elements at least partially suspended in a generally randomly movable condition for movement to said position of said operating element and for physically displacing one of said additional elements to said position in said circuit from which said operating element is displaced in response to a failure therein until substantially all of said additional operating elements have been utilized in said system.

7. A self-repairing system comprising
   (a) a source of energy,
   (b) a work load,
   (c) a circuit for receiving energy from said source and transmitting the same to said work load,
   (d) an operating element in said circuit rendered inoperative and physically displaceable from its position in said circuit in response to failure therein,
   (e) a plurality of additional operative elements in said system but not in said circuit, and
   (f) means automatically operable for maintaining said additional elements at least partially suspended in a generally randomly movable condition for movement to any of said operating positions and for automatically moving one of said additional elements to each operating position from which an operating element is physically displaced in response to the occurrence of a failure condition,
   (g) said last mentioned means comprising a fluid medium maintaining said additional operating elements in a random substantially floating state.

8. In a self-repairing and sustaining system,
   (a) fluid pumping and circulating means,
   (b) a housing in flow communication with said means,
   (c) a partition within said housing dividing the same into compartments,
   (d) said partition having sockets opening therethrough to provide seats and when open to provide fluid flow between said compartments, and
   (e) sub-assembly units seatable and retainable in said sockets when in operating condition and capable of passing through said sockets when in inoperative condition,
   (f) there being a supply of spare sub-assembly units in the one compartment each of which is adapted under the action of said fluid pumping and circulating means to be seated and retained in any of said sockets free to receive the same, (g) said system being electrical and the fluid being a dielectric liquid and the socket seats and subassembly units having contact means associated therewith adapted to make and complete contact therebetween when said units are seated in said socket seats.

References Cited by the Examiner

UNITED STATES PATENTS 2,785,317  3/1957  Langberg et al. _____ 307—64

ORIS L. RADER, *Primary Examiner.*

LLOYD McCOLLUM, MILTON O. HIRSHFIELD,
*Examiners.*

L. R. CASSETT, T. J. MADDEN, *Assistant Examiners.*